A. A. HOUGHTON.
Scale-Beam.
No. 213,423. Patented Mar. 18, 1879.
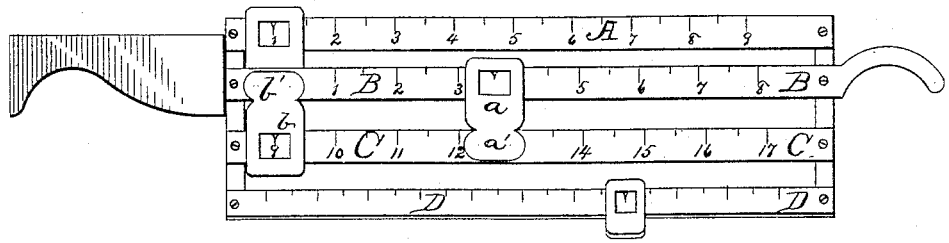

UNITED STATES PATENT OFFICE.

ALFRED A. HOUGHTON, OF BUFFALO, NEW YORK, ASSIGNOR TO BUFFALO SCALE COMPANY, OF SAME PLACE.

IMPROVEMENT IN SCALE-BEAMS.

Specification forming part of Letters Patent No. 213,423, dated March 18, 1879; application filed February 11, 1879.

*To all whom it may concern:*

Be it known that I, ALFRED A. HOUGHTON, of Buffalo, in the county of Erie and State of New York, (assignor to the BUFFALO SCALE COMPANY, of same place,) have made certain Improvements in Weighing-Scales, of which the following is a specification:

This improvement relates to poises on two or more beam-scales, to insure correct weighing on all double-beam or compound-beam scales; and the invention consists in the construction and arrangement of the poises used on said beams, by making the poise or poises of any beam not only indicate the weight on its own beam, but also, by elongating it at either top or bottom, cover up the figures of the next beam above or below it, so as to insure correct weighing and prevent the wrong poise from being used.

The disadvantage of the present two or more beam scales is, that the beams being apart to a greater or less distance in large or small scales, persons not entirely used to them will move the wrong poise, and therefore will not get the correct weight. To avoid this I have made these poises with an elongated end, to extend over and cover the figures in line with it on the beam above or below it, so that its index will only point to the figures on its own beam, and cover up those on the beam next to it, also preventing the use of the wrong poise, as the right-hand one must always be pushed out first, thus additionally preventing the wrong one being used.

In the drawing, the figure represents a side elevation of a compound beam, the upper one, A, being the tare-beam, only used for taking the tare. This is generally marked "Tare," so as to prevent mistakes.

Beams B and C are the main weighing-beams, progressively or consecutively marked from the end of the first, B, to the beginning of the second, C. Beam D is the lower one, only used as a unit-beam, and has its own poise.

The upper beam, A, and the lower beam, D, stand so far from the main weighing-beams B and C, and are so marked, as not to require improvement in poises; but the main weighing-beams B and C are provided with poises *a b*, respectively, which not only indicate by an index thereon, or otherwise, the figures or weight on the beam on which the said poise rides, but also are made with elongated ends *a'* and *b'*, which extend over the next beam, above or below, to cover or conceal the figures thereon in a line with the poise, and by this means prevent their being read as weight. They also prevent the wrong poise being used first, as before explained.

If three main beams are employed, the poises would extend over them to cover all but its own line, the figures of which would be shown by an opening in the poise, or by an index.

I disclaim the use of two or more poises on a single-beam scale, (consecutively marked in lines,) said poises necessarily covering more than one line of figures on a single beam; but I believe myself to be the first to simplify weighing on double or compound beam scales, by making the poises so that no mistake in their use need be made.

I claim—

In a double or compound beam scale, each poise *a b* indicating the figures (or weight) on one beam, and at the same time completely covering the figures in a direct line with it on the beam or beams immediately above or below it, by being constructed with an extension or elongation, *a' b'*, to prevent using the wrong poise, substantially as specified.

In witness whereof I have hereunto signed my name in the presence of two subscribing witnesses.

A. A. HOUGHTON.

Witnesses:
 J. R. DRAKE,
 T. H. PARSONS.